United States Patent
Kunz

(10) Patent No.: US 11,204,818 B1
(45) Date of Patent: Dec. 21, 2021

(54) CLOUD APPLICATION PROGRAMMING MODEL

(71) Applicant: SAP SE, Walldorf (DE)

(72) Inventor: David Kunz, Wilhelmsfeld (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/160,587

(22) Filed: Jan. 28, 2021

(51) Int. Cl.
*G06F 9/54* (2006.01)
*G06F 16/28* (2019.01)

(52) U.S. Cl.
CPC ............ *G06F 9/542* (2013.01); *G06F 9/547* (2013.01); *G06F 16/285* (2019.01); *G06F 9/546* (2013.01)

(58) Field of Classification Search
CPC ........ G06F 9/4812; G06F 9/542; G06F 9/547; G06F 9/548
USPC .................................................. 719/318, 330
See application file for complete search history.

(56) References Cited

U.S. PATENT DOCUMENTS

| | | | |
|---|---|---|---|
| 10,623,390 B1* | 4/2020 | Rosenhouse | H04L 61/2525 |
| 10,965,752 B1* | 3/2021 | Smith | G06F 16/285 |
| 2021/0084109 A1* | 3/2021 | Gimenez Palop | H04L 63/0428 |
| 2021/0152554 A1* | 5/2021 | Taft | G06F 9/5027 |

* cited by examiner

*Primary Examiner* — Andy Ho
(74) *Attorney, Agent, or Firm* — Fish & Richardson P.C.

(57) ABSTRACT

Methods, systems, and computer-readable storage media for receiving, by an application programming framework within the cloud platform, a first request from an application, determining, by a generic event handler of the application programming framework, to handle the first request, transmitting, by the generic event handler, a second request to a sidecar that is executed within the cloud platform, the sidecar processing the second request to communicate with an unsupported resource and provide a first result comprising data from the unsupported resource, receiving, by the generic event handler and from the sidecar, the first result, and transmitting, from the generic event handler, a first response to the application, the first response comprising at least a portion of the data of the first result.

20 Claims, 4 Drawing Sheets

CLOUD APPLICATION PROGRAMMING MODEL

BACKGROUND

Cloud computing can be described as Internet-based computing that provides shared computer processing resources, and data to computers and other devices on demand. Users can establish respective sessions, during which processing resources, and bandwidth are consumed. During a session, for example, a user is provided on-demand access to a shared pool of configurable computing resources (e.g., computer networks, servers, storage, applications, and services). The computing resources can be provisioned and released (e.g., scaled) to meet user demand. As noted above, an example cloud platform includes SAP CP.

A common architecture in cloud platforms includes services (also referred to as microservices), which have gained popularity in service-oriented architectures (SOAs). In such SOAs, applications are composed of multiple, independent services. The services are deployed and managed within the cloud platform and run on top of a cloud infrastructure. In some examples, service-based applications can be created and/or extended using an application programming framework.

In some instances, during run-time, service-based applications use events that can be sent to resources to request execution of some functionality and receive results therefrom. An event can represent requests coming in through synchronous application programming interfaces (APIs), as well as asynchronous event messages. In some examples, event handlers handle incoming events (e.g., events issued by applications). For example, in response to receipt of an event, an event handler, corresponding to the event, executes one or more actions (e.g., connect to a resource).

However, some frameworks do not support all types of events. That is, for example, some frameworks do not provide event handlers for every type of event that might be received. For example, and without limitation, some frameworks enable direct connection to some resources (e.g., services, applications, databases), but do not enable direct connection to other resources. Accordingly, applications executing in a cloud platform can be limited in resources the applications can connect to.

SUMMARY

Implementations of the present disclosure are directed to enabling cloud-based applications to connect to resources that are unsupported by a cloud platform, within which the cloud-based applications are executed. More particularly, implementations of the present disclosure are directed to use of an event-driven runtime to enable cloud-based applications to connect to unsupported applications.

In some implementations, actions include receiving, by an application programming framework within the cloud platform, a first request from an application, determining, by a generic event handler of the application programming framework, to handle the first request, transmitting, by the generic event handler, a second request to a sidecar that is executed within the cloud platform, the sidecar processing the second request to communicate with an unsupported resource and provide a first result including data from the unsupported resource, receiving, by the generic event handler and from the sidecar, the first result, and transmitting, from the generic event handler, a first response to the application, the first response including at least a portion of the data of the first result. Other implementations of this aspect include corresponding systems, apparatus, and computer programs, configured to perform the actions of the methods, encoded on computer storage devices.

These and other implementations can each optionally include one or more of the following features: the second request is transmitted as one of a hypertext transfer protocol (HTTP) request and a remote procedure call (RPC); the first request indicates an entity that is modeled within the application programming framework within an entity data model, and the generic event handler determines to handle the first request in response to the entity being included in the first request; the unsupported resource includes one of a messaging system and a database system; actions further include receiving, by the application programming framework, a third request from the application, determining, by an event handler of the application programming framework, to handle the third request, transmitting, by the event handler, a fourth request to a supported resource within the cloud platform, receiving, by the event handler, a second result including data from the supported resource, and transmitting, from the event handler, a second response to the application, the second response including at least a portion of the data of the second result; the sidecar includes a Distributed Application Programming (DAPR) sidecar; and the sidecar is executed in Kubernetes within the cloud platform.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
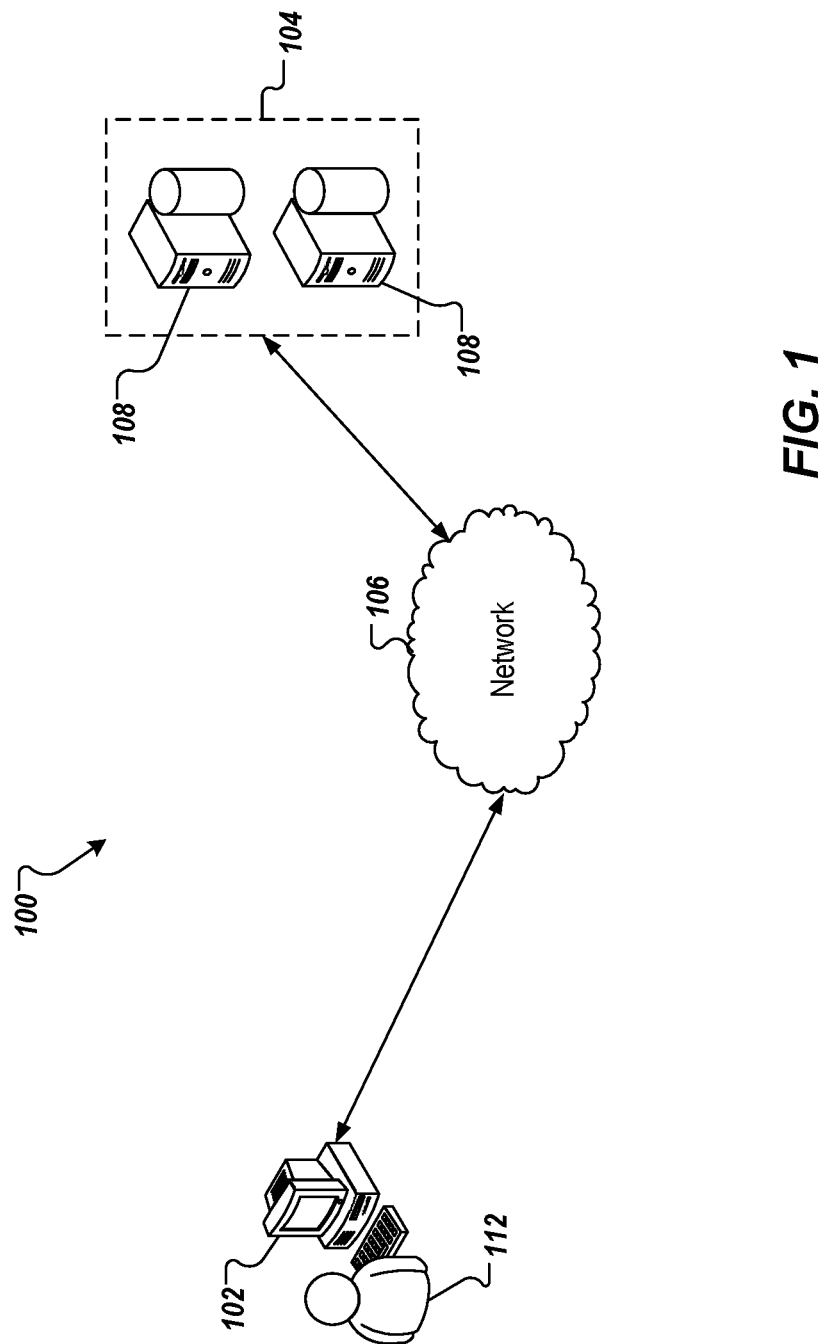
FIG. 1 depicts an example architecture that can be used to execute implementations of the present disclosure.

Implementations of the present disclosure are directed to enabling cloud-based applications to connect to resources that are unsupported by a cloud platform, within which the cloud-based applications are executed. More particularly, implementations of the present disclosure are directed to use of an event-driven runtime to enable cloud-based applications to connect to unsupported resources.

Implementations can include actions of receiving, by an application programming framework within the cloud platform, a first request from an application, determining, by a generic event handler of the application programming framework, to handle the first request, transmitting, by the generic event handler, a second request to a sidecar that is executed within the cloud platform, the sidecar processing the second request to communicate with an unsupported resource and provide a first result including data from the unsupported resource, receiving, by the generic event handler and from the sidecar, the first result, and transmitting, from the generic event handler, a first response to the application, the first response including at least a portion of the data of the first result.

Implementations of the present disclosure are described in further detail herein with reference to an example cloud platform. The example cloud platform includes SAP Cloud Platform (CP) provided by SAP SE of Walldorf, Germany. SAP CP can be described as a platform-as-a-service (PaaS) for creating applications or extending existing applications in a secure cloud computing environment. An example application programming framework includes the SAP Cloud Application Programming Model (CAPM) also provided by SAP SE of Walldorf, Germany. CAPM (also referred to as CAP) can be described as a framework of languages, libraries, and tools for creating and/or extending enterprise-grade services and applications. More particularly, CAP provides a programming model to create cloud-based applications for SAP and/or users of SAP products, the cloud-based applications being executable in SAP CP. CAP provides a framework to interpret domain language, in which data models are defined in a declarative way (i.e., not programmatically). Further detail on CAP is provided at https://cap.cloud.sap/, the content of which is expressly incorporated herein by reference. Although implementations of the present disclosure are illustrated with reference to SAP CP and CAP, it is contemplated that implementations of the present disclosure can be realized with any appropriate cloud platform and/or application programming framework.

To provide further context for implementations of the present disclosure, cloud computing can be described as Internet-based computing that provides shared computer processing resources, and data to computers and other devices on demand. Users can establish respective sessions, during which processing resources, and bandwidth are consumed. During a session, for example, a user is provided on-demand access to a shared pool of configurable computing resources (e.g., computer networks, servers, storage, applications, and services). The computing resources can be provisioned and released (e.g., scaled) to meet user demand. As noted above, an example cloud platform includes SAP CP.

A common architecture in cloud platforms includes services (also referred to as microservices), which have gained popularity in service-oriented architectures (SOAs). In such SOAs, applications are composed of multiple, independent services. The services are deployed and managed within the cloud platform and run on top of a cloud infrastructure. In some examples, service-based applications can be created and/or extended using an application programming framework, such as CAP, introduced above.

In modern software deployments, containerization is implemented, in which services are deployed in standalone containers with well-defined interfaces. Containerization can be described as operating system (OS) virtualization. In containerization, applications (or microservices, software processes) are run in isolated user spaces referred to as containers. The containers use the same shared OS, and each provides a fully packaged and portable computing environment. That is, each container includes everything an application needs to execute (e.g., binaries, libraries, configuration files, dependencies).

Container orchestration automates the deployment, management, scaling, and networking of containers. For example, container orchestration systems, in hand with underlying containers, enable applications to be executed across different environments (e.g., cloud computing environments) without needing to redesign the application for each environment. Enterprises that need to deploy and manage a significant number of containers (e.g., hundreds or thousands of containers) leverage container orchestration systems. An example container orchestration system is the Kubernetes platform, maintained by the Cloud Native Computing Foundation, which can be described as an open-source container orchestration system for automating computer application deployment, scaling, and management.

At a high level, the Kubernetes platform (also referred to herein as Kubernetes) is made up of a central database containing descriptions of the required states of resources managed in the platform, and a collection of controllers. The controllers monitor the required state of the resources they are tasked to and take any required action to make sure that the actual states of the resources match the required states. The controllers also update the Kubernetes central database with the current resource status. In some instances, a user interacts with the cluster by modifying the required state of a resource and waiting for the relevant controller to modify the actual state of the resource to match.

In some instances, during runtime, service-based applications use events for requests to resources to request execution of some functionality and receive results therefrom. An event can represent requests coming in through synchronous application programming interfaces (APIs), as well as asynchronous event messages. In some examples, event handlers handle incoming events (e.g., events issued by applications). For example, in response to receipt of an event, an event handler, corresponding to the event, executes one or more actions (e.g., connect to a resource).

However, some frameworks only provide native support for a subset of resources. For example, a framework, such as CAP, enables direct connection to some resources (e.g., services, applications, databases), but does not enable direct connection to other resources. Resources that can be connected to can be referred to as supported resources, while resources that cannot be directly connected to can be referred to as unsupported resources. More plainly stated, a supported resource is a resource, for which the framework has an event handler to enable direct communication with the resource (e.g., a message sent from the framework to the resource), and an unsupported resource is a resource, for which the framework is absent an event handler to enable direct communication with the resource. Consequently, applications executing in a cloud platform can be limited in resources the applications can connect to.

In some frameworks, custom drivers can be manually programmed to enable applications to communicate with unsupported resources. However, this presents a significant burden in terms of time and technical resources. For example, time and technical resources would need to be expended to program custom drivers for every application and every type of request. As another example, further technical resources need be expended to store and maintain the numerous custom drivers within the framework.

In view of the above context, implementations of the present disclosure provide introduce use of an event-driven runtime to enable cloud-based applications to connect to unsupported applications. More particularly, and as described in further detail herein, a framework provides generic event handlers, which handle requests to unsupported resources. The generic event handlers communicate requests to the unsupported resources through the event-driven runtime.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In some implementations, the server system 104 can host an application programming framework (e.g., CAP). In some examples, the user 112 (e.g., a programmer) can use the application programming framework to develop one or more applications (also referred to as projects). In some examples, each application includes a root file that records metadata that is relevant to the application. An example root file includes, without limitation, a package.json file, which can be described as providing information to a node package manager (NPM), which enables the NPM to identify the application as well as handle the application's dependencies (NPM being the default package manager for JavaScript's runtime Node.js). The root file can also contain other metadata such as a description, a version, license information, and configuration data. An example package.json file for an example application developed using CAP can be provided as:

```
{
  "name": "1.hello-world",
  "version": "1.0.0,
  "description": "A simple CAP project.",
  "repository": "<Add your repository here>",
  "license": "ISC",
  "dependencies": {
    "isomorphic-fetch": "latest",
    "body-parser": "latest",
    "@sap/cds": "^3",
    "express": "^4",
    "sqlite3": "latest"
  },
  "scripts": {
    "start": "dapr run --app-id products --app-port 4004 --port 3500 --config ../tracing.yaml cds run"
  },
  "cds": {
    "requires": {
      "db": {
        "kind": "sqlite",
        "model": [
          "db/",
          "srv/",
          "app/"
        ]
      }
    }
  }
}
```

Listing 1: Example package.json File

In some examples, configuration data in any appropriate files associated with the application (e.g., .cdsrc.json file).

In general, the application is associated with configuration data that can indicate resources that the application is expected to access during execution. That is, resources that are to be accessed by the application are configured through configuration data of the application. In the example of Listing 1, an example resource is a SQLite database. It is contemplated, however, that the configuration data can indicate any appropriate resource (e.g., database systems, messaging systems) either supported or unsupported by the application programming framework.

In accordance with implementations of the present disclosure, the application can implicate entities, each entity being defined using an entity data model (EDM). In some application programming frameworks, such as CAP, the Common Schema Definition Language (CSDL) (used as part of the Open Data protocol (OData)) defines an eXtensible Markup Language (XML) representation of the EDM, which is exposed by an OData service. In general, an EDM is a declarative model that defines an entity and properties of the entity.

For purposes of illustration, and without limitation, an application can be provided, which provides functionality related to books (e.g., reading information representing books from a database and displaying the information within a user interface (UI)). For this, an EDM for books, as an entity, can be provided. An example EDM for books can be provided as, without limitation:

entity books {
key ID: UUID;

```
title: String;
author: String;
}
```

Listing 2: Example EDM

The example EDM of Listing 2 defines an entity with a key property of universally unique identifier (UUID), and additional properties of title and author.

During runtime, the application can issue requests as events (introduced above). In some examples, and as described in further detail herein, a request is received (as an event) and an event handler handles the event. Continuing with the example above, in response to a UI being opened within the application, the application can issue a request to retrieve information on books stored in a database. An example request can be provided as:

GET localhost:8080/Books

Listing 3: Example Request from Application

Upon receipt of the request, the request is delegated to an event handler. For example, the application programming framework (e.g., CAP) receives the request and delegates the request to an event handler. In some examples, the event handler handles the request by communicating with one or more resources to provide a result. For example, the event handler can send a read request to read information on books from a database. The event handler then returns the result to the application. For example, the result is provided as an array of books that each have some identifier (UUID), title, and author, and the information can be populated within a table in the UI. An example result can be provided as, without limitation:

```
[
  {
    ID: 2114223-232323-22323
    title: 'my book'
    author: 'my author'
  }
]
```

Listing 4: Example Response

As discussed above, some communication to resources is not natively supported by the application programming framework. For example, and using SAP CAP as a non-limiting example, while CAP supports communication with SAP Enterprise Messaging, CAP does not support communication with other messaging services (e.g., Kafka, RabbitMQ). That is, if an application sends a request for messaging using SAP Enterprise Messaging, CAP provides an event handler that can handle the request. However, if the application sends a request for messaging using Kafka, prior to implementations of the present disclosure, CAP is absent an event handler that can handle the request. As another example, and again using SAP CAP as a non-limiting example, while CAP supports communication with database systems, such as SAP HANA and PostgreSQL, CAP does not support communication with database systems, such as MySQL and Oracle. That is, if an application sends a request to perform one or more functions (e.g., read, filter, sort, group) on data stored in SAP HANA (or PostgreSQL), CAP provides an event handler that can handle the request. However, if the application sends a request to perform one or more functions on data stored in MySQL (or Oracle), prior to implementations of the present disclosure, CAP is absent an event handler that can handle the request.

As described in further detail herein, implementations of the present disclosure provide generic event handlers that communicate with an event-driven runtime within the cloud platform. The event-driven runtime enables communication with resources that are not natively supported by the application programming framework (e.g., CAP) to enable results from such resources to be returned to applications executing within the cloud platform.

In further detail, a configuration of an application can indicate one or more resources that are expected to be communicated with. For example, the package.json file and/or the .cdsrc.json file can include configuration data to configure the application for communication with a resource. With non-limiting reference to a database system, the configuration data can specify a database system that the application is expected to communicate with.

For example, a configuration for HANA (e.g., "db": "kind": "liana", . . . ). In this example, an event handler is provided, which handles the request by directly communicating with a supported resource. Continuing with the example above, example logic of an example event handler (non-generic) can be provided as:

```
// non-generic logic w.r.t. supported database system
   ('READ', 'Books', (req)=>hanaDatabase.read([ . . . ])))
```

Listing 5A: Example Logic of Example Generic Event Handler

In the example of Listing 5A, hanaDatabase.read uses a direct connection to HANA and only works with HANA.

As another example, a configuration for MySQL (e.g., "db": {"kind": "mysql", . . . ). In this example, a generic event handler is provided, which handles the request by sending a request to the event-driven runtime. Continuing with the example above, example logic of an example generic handler can be provided as:

```
// generic logic w.r.t. unsupported database system srv.on
   ('READ', req=>{
   return http://db.read(req.target)
})
```

Listing 5B: Example Logic of Example Generic Event Handler

In this example, when a request is received, an entity name is determined from req.target. The generic event handler, which uses a database API (db.read) to read information on the entity from a database. For example, in response to the request including the entity Books, the request is delegated to the generic event handler for the entity Books, which queries a database (e.g., MySQL) by a call to the database API (db.read).

In some implementations, when the application is started, the application programming framework reads the entity data models and configuration files and determine, which handlers are needed for execution of the application. The application programming framework provides event handlers (e.g., for supported resources) and generic event handlers (e.g., for unsupported resources) to support request from the application.

In accordance with implementations of the present disclosure, the request from the generic event handler is received by the event-driven runtime through a respective API (e.g., db.read). An example event-driven runtime includes, without limitation, the Distributed Application Runtime (DAPR) provided by Microsoft Corporation. DAPR can be described as a portable, serverless, event-driven runtime that supports creation of resilient microservices (both stateless and stateful) that run on the cloud and that supports the diversity of languages and developer frameworks. DAPR runs natively on Kubernetes, discussed above.

In operation, DAPR injects a so-called sidecar (e.g., a container, a process) to the application programming framework (e.g., CAP). In some examples, the sidecar is instantiated upon instantiation of the application (e.g., the application and/or the application programming framework triggers DAPR to instantiate a sidecar for the application). The generic event handlers interact with the sidecar through HTTP or gRPC communication. The sidecar functions as an intermediary between the framework and unsupported resources. For example, a generic event handler of the framework sends a request to the sidecar (HTTP, gRPC), and the sidecar processes the request, communicates with the unsupported resource, and returns a result to the generic event handler. With non-limiting reference to the example of Listing 4B, db.read uses the sidecar and works with every database supported by the sidecar.

To enable this, implementations of the present disclosure provide computer-executable code within the framework, which enables the use of APIs for communication with the sidecar. The computer-executable code is provided in a file, such as a Javascript file (.js). An example file is referred to as capr.js, which includes the following example code:

```
let cds
let bodyParser
let fetch
const daprPort = process.env.DAPR_HTTP_PORT || 3500
const daprUrl = `http://localhost:${daprPort}/v1.0`
const stateUrl = `${daprUrl}/state`
const publishUrl = `${daprUrl}/publish`
const invokeUrl = `${daprUrl}/invoke`
const getIdentifier = (entity, payload) =>
    Object.keys(entity.keys).reduce(
        (res, curr) => `${res}-${curr}=${payload[curr]}`,
        entity.name
    )
const store = async (entity, payload) => {
  const identifier = getIdentifier(entity, payload)
  const state = [
      {
        key: identifier,
        value: payload
      }
  ]
    const response = await fetch(stateUrl, {
      method: `POST`,
      body: JSON.stringify(state),
      headers: {
        `Content-Type`: `application/json`
      }
    })
    if (!response.ok) {
      throw `Failed to persist state.`
    }
  }
const emit = async (topic, payload) => {
  const response = await fetch(`${publishUrl}/${topic}`, {
      method: `POST`,
      body: JSON.stringify(payload),
      headers: {
        `Accept`: `application/json`,
        `Content-Type`: `application/json`
      }
    })
    if (!response.ok) {
      throw `Failed to emit message.`
```
```
    }
  }
const retrieve = async (entity, data) => {
    const keys = Object.keys(entity.keys).reduce((res, curr)
 => {
        res[curr] = data[curr]
        return res
    }, { })
    const identifier = getIdentifier(entity, keys)
    const res = await fetch(`${stateUrl}/${identifier}`)
    if (!res.ok) {
      throw `Could not get state.`
    }
    const text = await res.text( )
    return text ? { ... keys, ... JSON.parse(text) } :
 undefined
  }
let bodyParserUsed = false
const subscriptions = [ ]
const on = (topic, handler) => {
    if (!cds.serve.app) {
        cds.once(`serve`, ( ) => on(topic, handler))
    } else {
        if (!bodyParserUsed) {
            cds.serve.app.use(bodyParser.json({ type:
 `application/*+json` }));
            bodyParserUsed = true
        }
        subscriptions.push(topic)
        cds.serve.app.get(`/dapr/subscribe`, (_req, res) => {
            res.json(subscriptions)
        })
        cds.serve.app.post(`/${topic}`, (req, res) => {
            Promise.resolve(handler(req.body)).then(( ) =>
 res.sendStatus(200)).catch(( ) => res.sendStatus(500))
        })
    }
  }
const invoke = async (appId, path, payload) => {
    const url = `${invokeUrl}/${appId}/method/${path}`
    const HTTPMethod = payload ? `POST` : `GET`
    const config = {
        method: HTTPMethod,
        headers: {
            `Accept`: `application/json`,
            `Content-Type`: `application/json`
        }
    }
    if (payload) {
        config.body = JSON.stringify(payload)
    }
    const response = await fetch(url, config)
    if (!response.ok) {
        if (response.status === 404) return
        throw `Failed to invoke.`
    }
    const text = await response.text( )
    return text ? JSON.parse(text) : undefined
  }
const init = (_cds, _bodyParser, _fetch) => {
    cds = _cds
    bodyParser = _bodyParser
    fetch = _fetch
    return { store, retrieve, on, emit, invoke }
  }
module.exports = init
```

Listing 6: Example Code of capr.js

In the example of Listing 6, the code is executed within the application programming framework to enable generic event handlers to communicate with the sidecar and any resources that are supported by the sidecar. For example, the example code of Listing 6 includes a retrieve function (const retrieve=async (entity, data)) (e.g., corresponding to db.read (req.target) in the above examples), which uses a HTTP request (await fetch ( . . . )) to communicate with the sidecar.

In this manner, implementations of the present disclosure are not limited to specific resources to communicate with through the sidecar. That is, communication is provided through the sidecar to any resource supported by the sidecar (e.g., resources that are unsupported for direct communication with the application programming framework).

Figure 2:
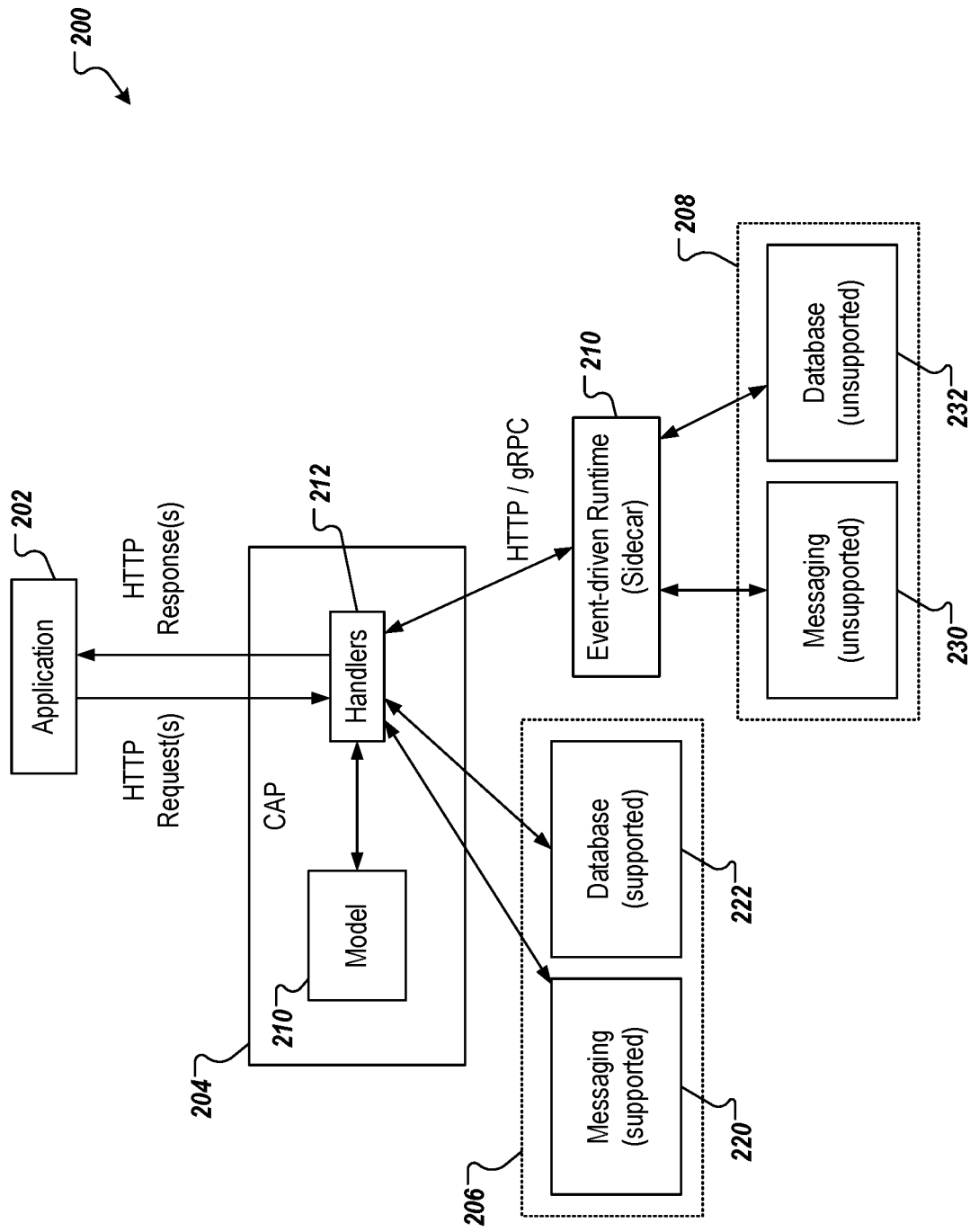
FIG. 2 depicts an example conceptual architecture in accordance with implementations of the present disclosure.

FIG. 2 depicts an example conceptual architecture 200 in accordance with implementations of the present disclosure. In the depicted example, the example conceptual architecture 200 depicts an application 202, an application programming framework 204, a set of supported resources 206, a set of unsupported resources 208, and an event-driven runtime 210. In the example of FIG. 2, the application programming framework 204 is provided as CAP, introduced above. The application programming framework 204 includes a model 210 and a set of event handlers 212.

In the example of FIG. 2, the set of supported resources 206 includes a messaging service 220 (e.g., SAP Enterprise Messaging) and a database system (e.g., SAP HANA, PostgreSQL, SQLite). Although the example of FIG. 2 provides examples of supported resources, any number and type of supported resources can be provided. Also in the example of FIG. 2, the set of unsupported resources 208 includes a messaging service 230 (e.g., Kafka, RabbitMQ) and a database system (e.g., MySQL, Oracle). Although the example of FIG. 2 provides examples of unsupported resources, any number and type of supported resources can be provided.

In operation, the application executes functionality, which can result in one or more requests (HTTP requests) to the application programming framework 204 (e.g., GET localhost:8080/Books). For each request received by the application programming framework 204, the request is delegated to an event handler. For example, each event handler can review the request and determine whether it can handle the request. If an event handler cannot handle the request, the event handler ignores the request. If an event handler can handle the request, the event handler handles the request.

In accordance with implementations of the present disclosure, requests to an unsupported resource in the set of unsupported resources 208 are handled by generic event handlers. More particularly, when a request to an unsupported resource is received from the application 202, a generic event handler corresponding to the request handles the request. For example, and referring to the example above, in response to the request GET localhost:8080/Books, the generic event handler that includes the method srv.on('READ', req=>{return http://db.read(req.target)}) can handle the request. Consequently, the generic event handler communicates with the sidecar 210 (e.g., by HTTP or gRPC) and the sidecar 210 communicates with the unsupported resource to provide a result. For example, the database system 232 can include a MySQL database, from which information on the entity Books is read and returned to the generic event handler through the sidecar 210. In turn, the generic event handler provides a response to the application 202, such as the response provided in Listing 4, above.

Figure 3:
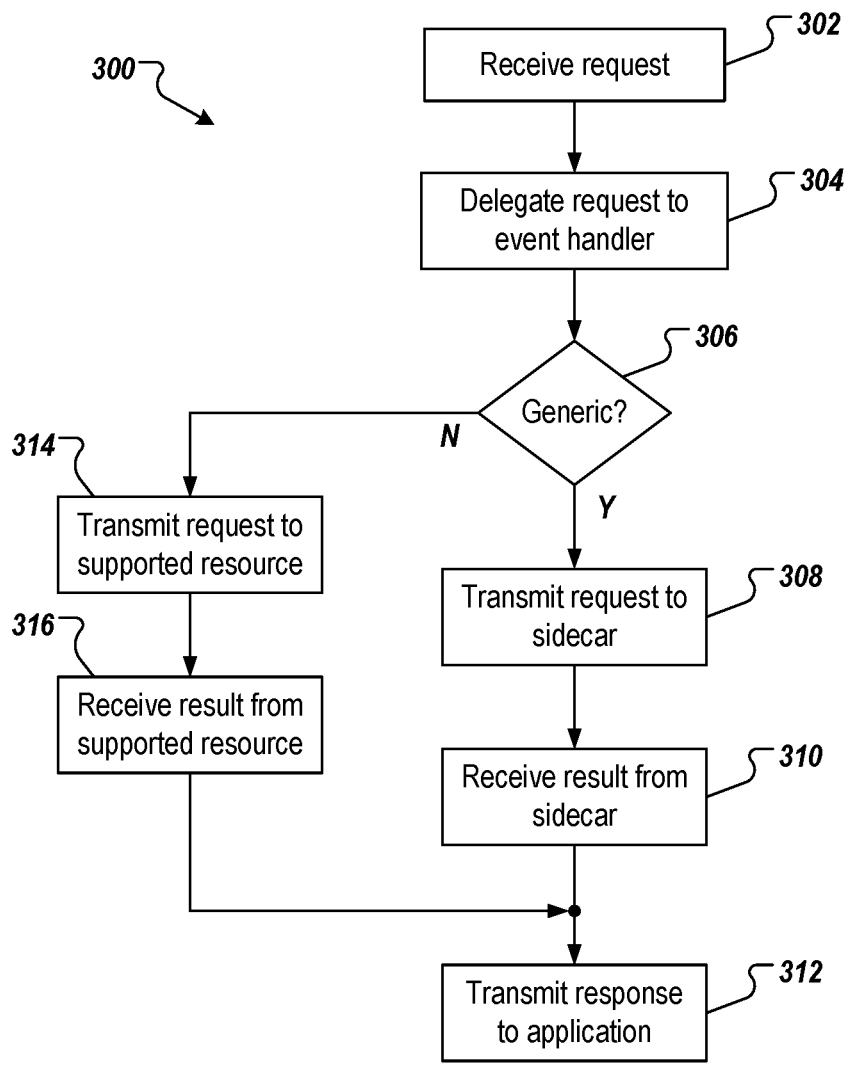
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable program executed by one or more computing devices.

A request is received (302). For example, the application programming framework 204 of FIG. 2 receives a request (e.g., HTTP request) from the application 202. The request is delegated to an event handler (304). For example, each of one or more of the event handlers 212 determine whether it can handle the request (e.g., based on an entity indicated within the request). In some examples, if the logic of the event handler indicates a direct connection to a supported resource (e.g., ('READ', 'Books', (req)=>hanaDatabase.read ([ . . . ])))), the event handler is a non-generic event handler that can handle the request. In some examples, if the logic of the event handler indicates an indirect connection to an unsupported resource (e.g., srv.on('READ', req=>{return http://db.read(req.target)}), indicating read through the db.read API), the event handler is a generic event handler that can handle the request.

It is determined whether the event handler is a generic event handler (306). If the event handler is a generic event handler, a request is transmitted to a sidecar (308). For example, the generic event handler transmits a request (e.g., using HTTP or gRPC) to the sidecar 210. The sidecar 210 processes the request and communicates with a corresponding unsupported service, such as one or more of the unsupported services 230, 232, and receives a result from the unsupported services(s). A result is received from the sidecar (310). For example, the generic event handler receives the result from the sidecar 210. A response is transmitted to the application (312). For example, the generic event handler processes the result from the sidecar 210 to provide a response (e.g., HTTP response), which is transmitted to the application 202.

If the event handler is not a generic event handler, a request is transmitted to a supported resource (314). For example, the event handler directly communicates with one or more of the supported services 220, 222. A result is received from the supported resource (316). A response is transmitted to the application (312). For example, the event handler processes the result from the supported resource(s) to provide a response (e.g., HTTP response), which is transmitted to the application 202.

Figure 4:
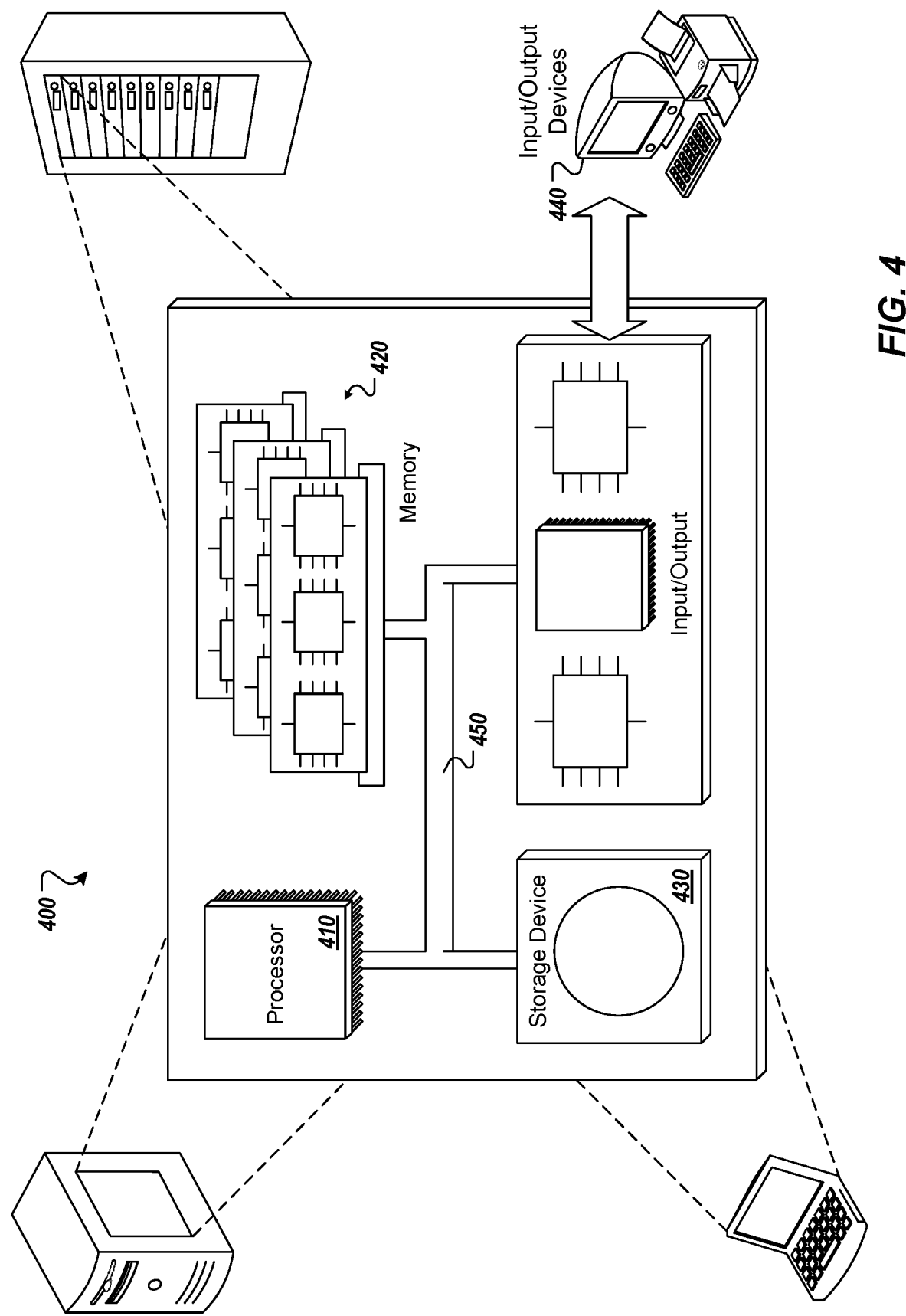
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for enabling communication with supported resources and unsupported resources in a cloud platform, the method being executed by one or more processors and comprising:
   receiving, by an application programming framework within the cloud platform, a first request from an application;
   delegating, by the application programming framework, the first request to a set of event handlers of the application programming framework, the set of event handlers comprising one or more generic event handlers and one or more non-generic event handlers;
   determining, by a generic event handler in the set of event handlers of the application programming framework, to handle the first request, logic of the generic event handler being indicative of an indirect connection to an unsupported resource;
   transmitting, by the generic event handler, a second request to a sidecar that is executed within the cloud platform, the sidecar processing the second request to communicate with the unsupported resource and provide a first result comprising data from the unsupported resource;
   receiving, by the generic event handler and from the sidecar, the first result; and
   transmitting, from the generic event handler, a first response to the application, the first response comprising at least a portion of the data of the first result.

2. The method of claim 1, wherein the second request is transmitted as one of a hypertext transfer protocol (HTTP) request and a remote procedure call (RPC).

3. The method of claim 1, wherein the first request indicates an entity that is modeled within the application programming framework within an entity data model, and the generic event handler determines to handle the first request in response to the entity being included in the first request.

4. The method of claim 1, wherein the unsupported resource comprises one of a messaging system and a database system.

5. The method of claim 1, further comprising:
   receiving, by the application programming framework, a third request from the application;
   determining, by an event handler of the application programming framework, to handle the third request;
   transmitting, by the event handler, a fourth request to a supported resource within the cloud platform;

receiving, by the event handler, a second result comprising data from the supported resource; and transmitting, from the event handler, a second response to the application, the second response comprising at least a portion of the data of the second result.

6. The method of claim 1, wherein the sidecar comprises a Distributed Application Programming (DAPR) sidecar.

7. The method of claim 1, wherein the sidecar is executed in Kubernetes within the cloud platform.

8. A non-transitory computer-readable storage medium coupled to one or more processors and having instructions stored thereon which, when executed by the one or more processors, cause the one or more processors to perform operations for enabling communication with supported resources and unsupported resources in a cloud platform, the operations comprising:

receiving, by an application programming framework within the cloud platform, a first request from an application;

delegating, by the application programming framework, the first request to a set of event handlers of the application programming framework, the set of event handlers comprising one or more generic event handlers and one or more non-generic event handlers;

determining, by a generic event handler in the set of event handlers of the application programming framework, to handle the first request, logic of the generic event handler being indicative an indirect connection to an unsupported resource;

transmitting, by the generic event handler, a second request to a sidecar that is executed within the cloud platform, the sidecar processing the second request to communicate with the unsupported resource and provide a first result comprising data from the unsupported resource;

receiving, by the generic event handler and from the sidecar, the first result; and transmitting, from the generic event handler, a first response to the application, the first response comprising at least a portion of the data of the first result.

9. The computer-readable storage medium of claim 8, wherein the second request is transmitted as one of a hypertext transfer protocol (HTTP) request and a remote procedure call (RPC).

10. The computer-readable storage medium of claim 8, wherein the first request indicates an entity that is modeled within the application programming framework within an entity data model, and the generic event handler determines to handle the first request in response to the entity being included in the first request.

11. The computer-readable storage medium of claim 8, wherein the unsupported resource comprises one of a messaging system and a database system.

12. The computer-readable storage medium of claim 8, wherein operations further comprise:

receiving, by the application programming framework, a third request from the application;

determining, by an event handler of the application programming framework, to handle the third request;

transmitting, by the event handler, a fourth request to a supported resource within the cloud platform;

receiving, by the event handler, a second result comprising data from the supported resource; and transmitting, from the event handler, a second response to the application, the second response comprising at least a portion of the data of the second result.

13. The computer-readable storage medium of claim 8, wherein the sidecar comprises a Distributed Application Programming (DAPR) sidecar.

14. The computer-readable storage medium of claim 8, wherein the sidecar is executed in Kubernetes within the cloud platform.

15. A system, comprising:

a computing device; and a computer-readable storage device coupled to the computing device and having instructions stored thereon which, when executed by the computing device, cause the computing device to perform operations for enabling communication with supported resources and unsupported resources in a cloud platform, the operations comprising:

receiving, by an application programming framework within the cloud platform, a first request from an application;

delegating, by the application programming framework, the first request to a set of event handlers of the application programming framework, the set of event handlers comprising one or more generic event handlers and one or more non-generic event handlers;

determining, by a generic event handler in the set of event handlers of the application programming framework, to handle the first request, logic of the generic event handler being indicative an indirect connection to an unsupported resource;

transmitting, by the generic event handler, a second request to a sidecar that is executed within the cloud platform, the sidecar processing the second request to communicate with the unsupported resource and provide a first result comprising data from the unsupported resource;

receiving, by the generic event handler and from the sidecar, the first result; and transmitting, from the generic event handler, a first response to the application, the first response comprising at least a portion of the data of the first result.

16. The system of claim 15, wherein the second request is transmitted as one of a hypertext transfer protocol (HTTP) request and a remote procedure call (RPC).

17. The system of claim 15, wherein the first request indicates an entity that is modeled within the application programming framework within an entity data model, and the generic event handler determines to handle the first request in response to the entity being included in the first request.

18. The system of claim 15, wherein the unsupported resource comprises one of a messaging system and a database system.

19. The system of claim 15, wherein operations further comprise:

receiving, by the application programming framework, a third request from the application;

determining, by an event handler of the application programming framework, to handle the third request;

transmitting, by the event handler, a fourth request to a supported resource within the cloud platform;

receiving, by the event handler, a second result comprising data from the supported resource; and transmitting, from the event handler, a second response to the application, the second response comprising at least a portion of the data of the second result.

20. The system of claim 15, wherein the sidecar comprises a Distributed Application Programming (DAPR) sidecar.

* * * * *